S. W. AVIS.
DRILL CHUCK.
APPLICATION FILED MAR. 21, 1919.
1,321,969.   Patented Nov. 18, 1919.
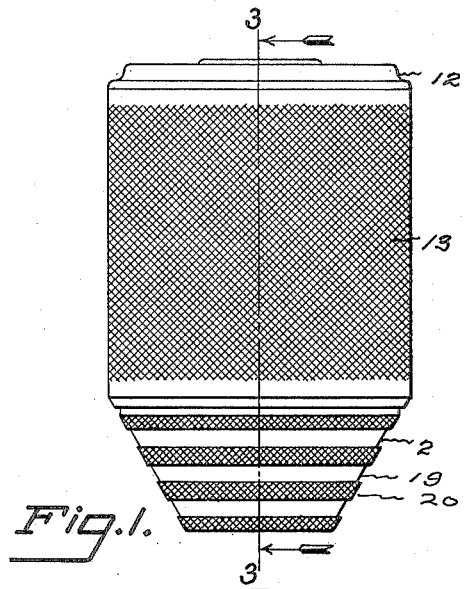
Fig.1.
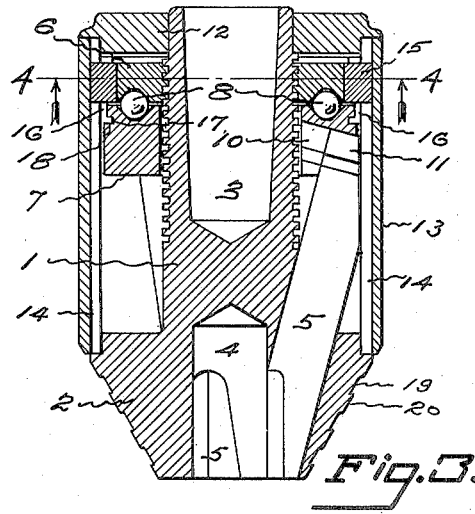
Fig.3.
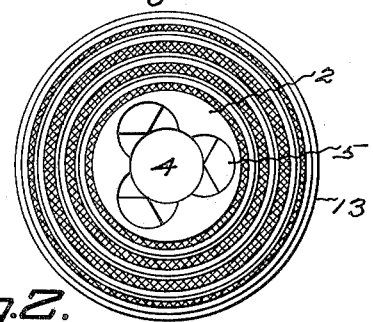
Fig.2.
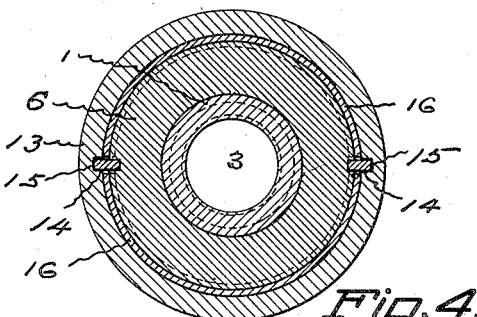
Fig.4.
Fig.5.   Fig.6.   Fig.7.   Fig.8.
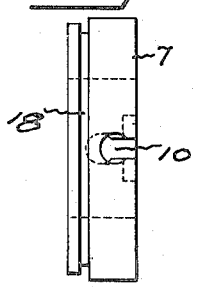
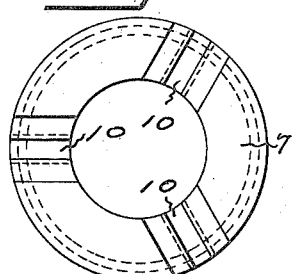
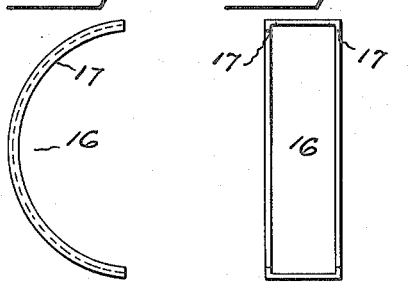
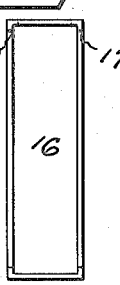
Fig.9.
Fig.10.
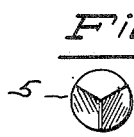
Fig.11.
Inventor
Samuel W. Avis by
Harry R. Williams
Attorney

UNITED STATES PATENT OFFICE.

SAMUEL W. AVIS, OF HARTFORD, CONNECTICUT, ASSIGNOR TO THE HARTFORD SPECIAL MACHINERY COMPANY, OF HARTFORD, CONNECTICUT, A CONNECTICUT STATUTE CORPORATION.

DRILL-CHUCK.

1,321,969.　　　　　Specification of Letters Patent.　　Patented Nov. 18, 1919.

Application filed March 21, 1919. Serial No. 284,095.

*To all whom it may concern:*

Be it known that I, SAMUEL W. AVIS, a citizen of the United States, residing at Hartford, in the county of Hartford and State of Connecticut, have invented a new and useful Improvement in Drill-Chucks, of which the following is a specification.

This invention relates to drill chucks of the type in which the jaws are loosely connected with a carrier that is moved longitudinally along the body for opening and closing the jaws by the pull and push of a nut which is threaded upon the body and is splined to a rotatory sleeve that incases the parts.

The object of this invention is to provide a chuck of this character that has but few parts, which parts are simple to make and assemble; that is strong and durable; that opens easily and closes tightly with relatively little effort and without the employment of supplementary tools; and that insures the accurate alinement of a drill held therein.

Figure 1 of the accompanying drawings shows a side elevation of a chuck that embodies the invention. Fig. 2 is a view looking at the jaw end of the chuck with the jaws opened. Fig. 3 is a central vertical section of the chuck with the jaws opened, on the plane indicated by the dotted line 3—3 on Fig. 1. Fig. 4 is a transverse section on the plane indicated by the dotted line 4—4 on Fig. 3. Fig. 5 shows an edge view of the carrier that advances and retracts the jaws. Fig. 6 is a face view of the carrier. Fig. 7 is an edge view of one section of the coupling that holds the carrier and the feed nut together. Fig. 8 is a view looking at the section of the coupling shown in Fig. 7. Fig. 9 is a top view of one of the jaws. Fig. 10 shows a side view of the jaw. Fig. 11 shows a view looking at the front end of the jaw.

The chuck body has a cylindrical stem 1 with a head 2 that is preferably conical as shown. The stem has a tapering socket 3 for the reception of the end of the chuck shank and the head has an opening 4 for the reception of the drill shank. Extending obliquely to the axis of the body through the head are circular bores for receiving the jaws 5 which are made from hardened pieces of round rod. The stem has a thread on its exterior and engaging this thread and turning on the stem is a nut 6.

The carrier 7 encircles the stem and is movable longitudinally thereof, preferably, but not necessarily, with a clearance between it and the stem. In ball races between the adjacent faces of the nut and carrier are anti-friction balls 8, which not only eliminate friction between the nut and carrier but centralize the carrier and prevent its binding on the stem when in service. The carrier is provided on one face with three inclined radially extending slots 10 that are larger in diameter back from than at the face of the collar, for receiving the key-shaped ends 11 of the jaws 5. On the shank end of the body stem is a closing disk 12, and turning between a shoulder on this disk and a shoulder on the head and surrounding the parts is a sleeve 13. This sleeve has two longitudinally extending grooves 14 in its inner wall, into which extend keys or splines 15 that are set into or formed on the periphery of the nut, so that turning the sleeve turns the nut without interfering with the movement of the nut along the stem.

The nut and the carrier are loosely held together by means of two segmental coupling pieces 16 which have inwardly extending flanges 17 on their edges, one flange projecting back of the nut and the other flange projecting into a groove 18 in the carrier.

When the sleeve is turned the keys turn the nut and the threads carry the nut along the stem. Turning the sleeve and nut in one direction, the carrier is advanced through the medium of the balls, and the jaws pushed downward, and as a result of the inclination of the bores in which the jaws move, they are forced toward each other. When the sleeve and nut are turned in the opposite direction the carrier, through the medium of the coupling sections, is drawn back and the jaws drawn upward and opened from each other.

In order to facilitate the easy operation of the chuck, particularly when the chuck is used on a machine where there is no part that can be grasped so as to retain the body stationary, the outer surface of the sleeve is knurled so that it may be readily grasped with one hand, and the tapering face of the head of the body is provided with grooves 19 that extend around it, and the lands 20, between the grooves are knurled so that the head can be grasped by the other hand and firmly held without exerting any particular effort to prevent the hand from slipping off from the tapered head.

It has been found by actual test that the chief factor tending to prevent the easy yet powerful closing of the jaws of a chuck of this general class, aside from the friction of the jaws in the inclined jaw bores, is the rubbing of the face of the nut against the face of the carrier as the nut rotates and pushes the carrier forward, the carrier, of course, not rotating, and the cramping of the carrier so that it binds either on the stem or the sleeve. In the construction herein illustrated, this friction is eliminated by the insertion of the balls between the nut and carrier, which balls permit the nut to force the carrier forward very powerfully and at the same time they roll so that there is no sliding friction between the nut and carrier, and no cramping of the carrier on any other part.

The structure illustrated is strong and solid, the jaws being held by the bores which are readily drilled in the head and stem that are integral. The stem is simply threaded and the nut quickly screwed upon the stem and easily keyed to the sleeve, while the carrier, sleeve and closing disk at the end of the stem are pieces cheaply formed. These parts are not only efficient, strong and durable, but they can be assembled for use by anyone. The jaws are interchangeable and simply move in and out in the solid body so that they may be fitted closely and will always remain true and accurately hold a drill in perfect alinement. As a result of the interposition of the balls between the nut and carrier, not only can the jaws be forced tightly against a drill shank but can be opened very easily and quickly without the use of other tools or implements.

The invention claimed is:—

1. A chuck having a body comprising a stem and head, a nut threaded upon the stem, a carrier movable freely along the stem, anti-friction balls between the nut and the carrier, means loosely connecting the nut and the carrier, whereby they will move together longitudinally of the stem but the nut may be rotated independently of the carrier, jaws movable obliquely in the head and connected with the carrier, a rotatably mounted sleeve incasing the parts, means connecting the nut and sleeve whereby turning the sleeve turns the nut, and a closing disk at the end of the sleeve back of the nut.

2. A chuck having a body comprising a stem and head, a nut threaded upon the stem, a carrier movable freely along the stem, jaws movable obliquely in the head and connected with the carrier, a disk on the stem, a sleeve rotatably mounted between the head and the disk, means connecting the nut and the sleeve so the rotation of the sleeve will rotate the nut, balls arranged between the nut and the carrier, and means connecting the nut and carrier whereby the nut and carrier will move together longitudinally of the stem but the nut may rotate independently of the carrier.

3. A chuck having a body comprising a cylindrical stem and head, a nut threaded upon the stem, a carrier movable freely along the stems, jaws movable obliquely in the head and connected with the carrier, a disk on the stem, a sleeve rotatably mounted between the head and the disk, keys connecting the nut and the sleeve, balls arranged between the nut and the carrier, and means connecting the nut and carrier whereby the nut and carrier will move together longitudinally of the stem but the nut may rotate independently of the carrier.

4. A chuck having a body comprising a stem and head, a nut threaded upon the stem, a carrier movable freely along the stem, jaws movable obliquely in the head and connected with the carrier, a disk on the stem, a sleeve rotatably mounted between the head and the disk, keys connecting the nut and the sleeve, balls arranged between the nut and the carrier, and segmental coupling pieces connecting the nut and carrier whereby the nut and carrier will move together longitudinally of the stem but the nut may rotate independently of the carrier.

5. A chuck having a body comprising a stem and head, a nut threaded upon the stem, a carrier movable freely along the stem, said carrier having radial slots that are wider in from the face of the carrier than at the face of the carrier, jaws movable obliquely in the head and having projections adapted to loosely fit in the slots in the carrier, a closing disk at the shank end of the stem, a sleeve rotatably mounted between the head and the disk, means connecting the nut and the sleeve so the rotation of the sleeve will rotate the nut, balls arranged between the nut and the carrier, and means connecting the nut and carrier, whereby the nut and carrier will move together longitudinally of the stem but the nut may rotate independently of the carrier.

SAMUEL W. AVIS.